United States Patent [19]
Lemonnier

[11] 3,955,654
[45] May 11, 1976

[54] HYDRAULIC RETARDER AND MOUNTING STRUCTURE THEREFOR

[75] Inventor: Daniel Claude Lemonnier, Paris, France

[73] Assignee: Labavia-S.G.E., Paris, France

[22] Filed: May 27, 1975

[21] Appl. No.: 580,620

[30] Foreign Application Priority Data
June 4, 1974   France .............................. 74.19247

[52] U.S. Cl. ............................ 188/296; 123/195 A; 403/4; 403/337; 417/362
[51] Int. Cl.² ..................... F16D 57/04; F16D 65/02
[58] Field of Search ........... 188/290, 296, 205, 206; 403/4, 337; 123/195 A, 198 C; 417/362; 180/53 FE

[56] References Cited
UNITED STATES PATENTS
2,563,409   8/1951   McNair et al. ....................... 403/4 X
FOREIGN PATENTS OR APPLICATIONS
2,230,236   5/1973   France ................................ 188/296
824,931    12/1959   United Kingdom ................. 403/337

*Primary Examiner*—George E. A. Halvosa
*Attorney, Agent, or Firm*—Ostrolenk, Faber, Gerb & Soffen

[57] ABSTRACT

A hydraulic retarder for braking a shaft has a rotor comprising a rotor shell mounted on the shaft end and rotatively movable relative to a stator shell forming part of a stator enclosing the rotor. The shaft end projects from a housing upon which the stator is mounted by an apertured structure surrounding a driving pulley mounted on the shaft end. The apertured structure comprises lugs on the housing and a toothed ring on the stator, the teeth in the ring co-operating with the lugs so as to hold the stator centred on the axis of the shaft end irrespective of the angular position of the stator. Recesses between the teeth of the ring are disposed and dimensioned so that they provide the necessary openings for moving an endless belt into or out of the structure simply by moving the stator through an angle.

11 Claims, 2 Drawing Figures

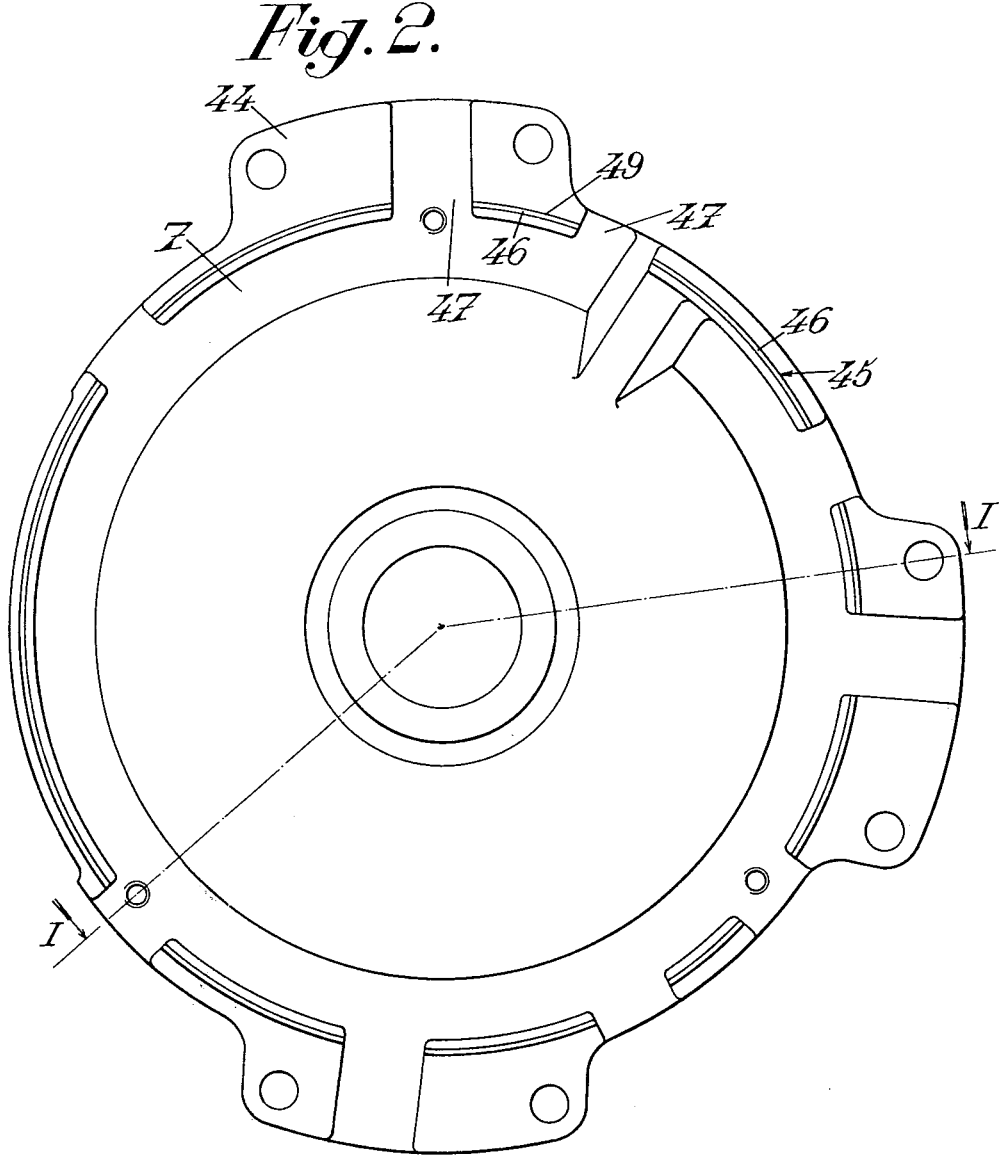

HYDRAULIC RETARDER AND MOUNTING STRUCTURE THEREFOR

BACKGROUND OF THE INVENTION

The invention relates to improvements in hydraulic retarders for braking the ends of drive shafts, such as crank shafts or the like, inter alia for vehicles.

In particular, the invention concerns a hydraulic retarder of the kind in which the rotor comprises a rotor shell mounted on a stub which is connected for rotation to the shaft end, the rotor shell being rotatively movable relative to a stator shell forming part of a stator enclosing the rotor, a working liquid being introduced into the rotor shell through the end of the latter from a central intake chamber situated near the axis of the rotor and being discharged therefrom at the larger diameter edge of the shell into a peripheral chamber.

French Pat. No. 2,230,236 discloses such a retarder in which facing zones of the outer surface of the rotor shell and of the inner surface of the stator are shaped to form an annular baffle having a constricted passage, the mean diameter of the constricted passage of the said baffle having a value such that the hydraulic thrusts exerted axially by the working liquid on the two surfaces of the rotor shell are in equilibrium, the contact between the relatively rotating parts of the retarder being limited solely to the sliding contact between a rigid annular bearing surface connected to one of said parts and an annular gasket borne by the other part.

As described in French Pat. No. 2,230,236, the aforementioned construction provides axial balancing which eliminates the need for a thrust bearing for securing the shaft end, thus considerably reducing the overall axial dimensions of the retarder. This advantage is important and often critical.

The proposed construction, however, must be exactly adjusted; this must be done at the factory or in the workshop and non-specialised users must not be allowed to dismantle the retarder themselves.

In the aforementioned construction, since the retarder is mounted at the end of the shaft, the pulley normally provided on the shaft end (e.g. for driving vehicle accessories such as a water pump, a cooling fan, a compressor, a vacuum pump, a dynamo, an alternator or the like) must be mounted between the retarder and the housing from which the shaft-end projects. The retarder stator is then secured to the casing by an apertured structure or cage enclosing part of the pulley.

If the endless belt on the pulley has to be replaced by a new endless belt, inter alia through breakage or excessive elongation, openings must be made in the structure, through which the new belt can be moved from an external position in which it surrounds the structure into an internal position in which it can be mounted without difficulty on the pulley.

SUMMARY OF THE INVENTION

The present invention aims to provide these openings without requiring dismantling of the retarder or interference with its axial position or centering, i.e. simply by angular movements of the entire retarder.

To this end, the present invention provides a retarder of the kind referred to above, in which the stator is mounted, by means of an apertured structure surrounding a driving pulley mounted on the shaft end to be braked, on a housing from which the shaft end projects, the apertured structure comprising lugs secured to one of the stator and the housing and a toothed ring secured to the other of the stator and the housing, the teeth in the ring being adapted to cooperate with the lugs so as to hold the stator in the position in which it is centred around the axis of the shaft end irrespective of the angular position of the stator, and the recesses providing angular separation between the teeth of the ring are disposed and dimensioned so that they provide all the required openings for moving an endless belt into or out of the structure, simply by moving the stator through an angle.

The teeth of the ring and the lugs preferably have complementary bearing surfaces respectively which extend along portions of the same cylinder of revolution coaxial with the shaft end so that the teeth can engage in the lugs.

When the stator is in the normal assembly position on the housing, a respective recess of the toothed ring may be angularly offset by a small angle relative to each lug, and the resulting offset angles corresponding to the different lugs all have the same sign.

Advantageously, when the stator is assembled in the normal position on the housing, two recesses of the toothed ring may be angularly offset through two small angles having opposite signs with respect to each lug.

BRIEF DESCRIPTION OF THE DRAWINGS

In order that the invention may be readily understood, an embodiment thereof will now be described, by way of example, with reference to the accompanying drawings, in which:

FIG. 2 is an end view of the toothed ring of the retarder.

DESCRIPTION OF THE PREFERRED EMBODIMENT

Figure 1:
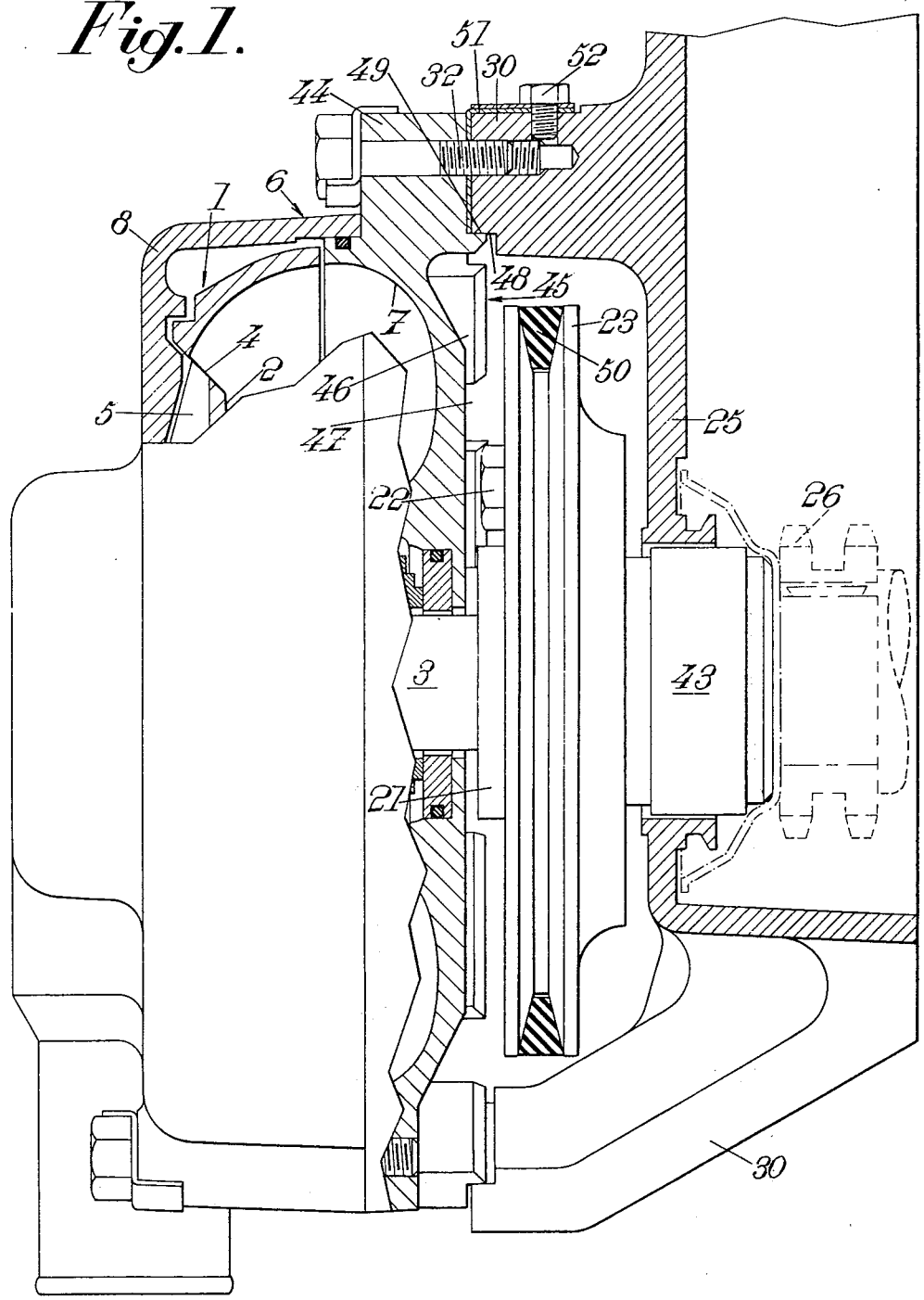
FIG. 1 is a diagrammatic axial section, along I—I of FIG. 2, through a retarder embodying the invention.

As in the French Pat. No. 2,230,236, the retarder has a rotor 1 comprising a rotor shell 2 defining a semi-toric cavity and mounted on a shaft end 3 to be braked, the end of the rotor shell being cut away at 4 and connected to a ring of blades 5 forming an inlet centrifugal pump. The rotor 1 is enclosed by a fixed casing or stator 6 comprising a stator shell 7 defining another semi-toric cavity and disposed axially opposite shell 2. A cover 8 completes the enclosure of the rotor shell 2.

The French Pat. No. 2,230,236 may be consulted with regard to the manner of assembling the rotor shell 2 on shaft end 3, the axial balancing of the rotor shell and, more generally, the operation of the retarder; these details are not directly part of the present improvement.

Here, it is sufficient to state that the rotor shown is adapted to brake the end of a shaft 43 (a crank shaft or the like) forming part of a vehicle engine, the end projecting from a housing 25, e.g. the housing containing the engine distribution gear 26; accordingly the shaft end 3 bearing the rotor shell 2 is a relatively short stub forming a unit with a plate 21 which is itself attached by bolts 22 to a pulley 23 driving the fan and the water pump of the engine vehicle. Pulley 23 itself forms the aforementioned end of shaft 43.

FIG. 1, as in French Pat. No. 2,230,236 also shows an apertured structure forming a sort of cage around pulley 23 and adapted to secure stator 6 on housing 25. The structure comprises lugs 30 which project axially from housing 25 to a relatively large radial distance from the axis of shaft 43, bolts 32 being screwed and keyed in the lugs, after passing through appropriate projections 44 in the stator shell 7.

The present improvement relates more particularly to the aforementioned apertured structure.

It will be remembered that the object of the improvement is to allow assembly of an endless belt on pulley 23 without dismantling the retarder or offsetting it axially with respect to shaft 43 or even moving it out of centre with respect to shaft 43, the structure being "opened" simply by angular movements of the stator around the axis of shaft 43.

To this end, the structure comprises a toothed ring 45 secured to stator 6, in addition to the aforementioned lugs 30 secured to housing 25. The teeth 46 of ring 45 are adapted to cooperate with the lugs 30 so as to centre the stator around the axis of shaft 43, irrespective of the angular position of the stator; and the recesses 47 providing angular separation between teeth 46 are disposed and dimensioned so that they provide all the necessary openings through which a belt adapted to cooperate with pulley 23 can be moved in or out of assembly 30, 45, simply by angular movement of the stator.

To this end, in the preferred embodiment shown, the teeth 46 and the lugs 30 have complementary bearing surfaces 48, 49 respectively which extend along portions of a single cylinder of revolution coaxial with shaft 43, so that the teeth can engage the lugs depending on the direction of the aforementioned axis.

In order to ensure centering in all the aforementioned cases, there must be contact between a lug and a tooth at least at three points around the ring, two of which are on opposite sides of the diametral plane extending through the third point and through the axis of shaft 43.

Of course, if there are only three lugs as in the preferred embodiment, the aforementioned condition means that there must never be complete loss of contact between a lug and the facing toothed ring, i.e. the circumferential extent of each lug must be greater than that of each recess in the ring so that, even if a recess comes into registry with a lug during angular movement of the stator, the lug remains in contact with the front tooth adjacent to the lug (considered in the direction of angular motion) until contact is made between the same lug and the rear tooth adjacent the same recess.

When the stator is mounted in the normal position on the housing 25, a respective recess of the toothed ring is angularly offset by a small angle with respect to each lug, the small angles of each offset all having the same sign.

In the embodiment shown in FIG. 2, in the normal assembly position, two recesses are angularly offset through two small angles having opposite signs with respect to each lug, so that when a belt is replaced, the stator can be rotated in either of the two possible directions, depending on requirements.

The following method is used for making a replacement of this kind or, more precisely, for inserting a belt 50 into the cage or perforated structure 30, 45.

First, the belt is placed around the structure, after disconnecting the pipes supplying water to the retarder, so that the belt can be placed around the retarder.

Next, bolts 32 are unscrewed and removed from their holes, so that the retarder can be moved through an angle without in any way modifying its axial position or centering. Next, the strands of belt 50 are introduced transversely into recesses 47 adjacent to teeth 46 disposed axially opposite lug 30, each recess being on one side of the adjacent tooth, the side being the same for all the recesses. For example, each recess is angularly offset with respect to the corresponding tooth in the clockwise direction if we consider axis 43 from the left in FIG. 1.

Next, the stator is moved angularly in the direction in which the recesses in question, together with the corresponding belt strands, move in front of the corresponding lugs, until the strands have moved completely past the lugs. Next, the belt strands are completely released from the recesses and placed inside the cage. Finally the stator is returned to its original angular position and bolts 32 are replaced.

Of course, the belt can be moved radially through the cage bars during the return journey of the stator instead of during its outward journey, as described hereinbefore.

Further, the aforementioned opening is limited to the necessary lugs; thus, it may happen that, in its operating position, the belt may have to go round one lug, in which case it need not pass it.

FIG. 1 shows an embodiment relating to the keys for ajdusting the axial position of the stator with respect to the casing. Bolts 32 generally extend through the keys.

In the embodiment, the keys are held in position even when bolts 32 are unscrewed and the stator is moved through an angle. In the present case each key is one arm of an angular member 51 which is secured to the corresponding lug 30 by its other arm, which is secured by a bolt 52 having an axis perpendicular to that of the corresponding bolt 32.

The keys may also have prolongations shaped so as to hold the keys automatically in position without special bolting, e.g. by engagement between the prolongations and the corresponding lugs.

It is envisaged that modifications may be made in the above described embodiments of the invention. For example, the periphery of the toothed ring may not be in the form of a single broken circle but instead be in the form of a number of arcs of circles which are broken and axially and/or radially offset, each arc being adapted to cooperate with at least one facing lug.

I claim:

1. A hydraulic retarder for braking a shaft end projecting from a housing and carrying a driving pulley, said retarder comprising:
   a stub which is connected to said shaft end for rotation therewith;
   a rotor comprising a rotor shell mounted on said stub;
   a stator enclosing said rotor and comprising a stator shell relative to which said rotor shell is rotatively movable, said stator providing a central liquid intake chamber situated near the axis of said rotor and a discharge chamber adjacent the periphery of said rotor shell;
   an apertured structure mounting said stator on said housing and surrounding said pulley;
   means for introducing a working liquid from the central intake chamber into said rotor shell from which the liquid is discharged into the peripheral discharge chamber;

an annular baffle formed by an outer surface portion of said rotor shell and a co-operating inner surface portion of said stator, said baffle defining a constricted passage between the discharge and intake chambers, which passage has a mean diameter such that the hydraulic thrusts exerted axially by the working liquid on the inner and outer surfaces of said rotor shell are in equilibrium; and an annular gasket borne by one of said rotor and said stator, the other of said rotor and stator having a rigid bearing surface in sliding contact with said gasket, the contact between said gasket and rigid bearing surface being the sole contact between said stator and rotor;

in which retarder the improvement comprises said apertured structure comprising:

lugs secured to one of said stator and said housing; and a toothed ring secured to the other of said stator and housing;

said lugs and ring mounting said stator for rotation relative to said housing from a normal assembled position of said stator on said housing;

said ring having teeth co-operating with said lugs to hold said stator centred on the axis of said shaft end irrespective of the angular position of said stator;

said ring having recesses between said teeth enabling an endless belt on said pulley to be exchanged by threading of the belt through the recesses and rotation of the stator through an angle.

2. A hydraulic retarder according to claim 1, wherein said lugs and the teeth of said ring have complementary bearing surfaces which extend along portions of the same cylinder of revolution coaxial with said shaft end so that said teeth engage in said lugs.

3. A hydraulic retarder according to claim 2, wherein the relative positions and dimensions of said teeth and said lugs are such that said lugs and teeth are permanently in contact at least at three points, two of which are on different sides of the diametral plane extending through the third point and through the axis of said shaft end.

4. A hydraulic retarder according to claim 3, wherein the number of said lugs is equal to three and the circumferential extent of each said lug is greater than that of each recess in said ring.

5. A hydraulic retarder according to claim 1, wherein, when said stator is in the normal assembled position on said housing, a respective recess of said toothed ring is angularly offset by a small angle relative to each said lug, and the resulting offset angles corresponding to the different lugs all have the same sign.

6. A hydraulic retarder according to claim 5, wherein, when said stator is in the normal assembled position on said housing, two recesses of said toothed ring are angularly offset through two small angles having opposite signs with respect to each said lug.

7. A hydraulic retarder according to claim 1, wherein the periphery of said toothed ring is in the form of a number of arcs of a circle which are broken and offset axially from one another, each arc co-operating with at least one of said lugs.

8. A hydraulic retarder according to claim 1, wherein the periphery of said toothed ring is in the form of a number of arcs of a circle which are broken and offset radially from one another, each arc co-operating with at least one of said lugs.

9. A hydraulic retarder according to claim 1, comprising mounting bolts securing said stator on said housing in the normal assembled position of stator on said housing, and keys for axially positioning said stator disposed between said lugs and said teeth, said mounting bolts extending through said keys in the normal assembled position of said stator, holding means being provided to hold said keys in position on said lugs when said mounting bolts are withdrawn therefrom.

10. A hydraulic retarder according to claim 9, wherein each said key comprises one arm of an angle member, said holding means comprising the other arm of said angle member and a retaining bolt screwing said other arm of said angle member to said lug.

11. A hydraulic retarder according to claim 9, wherein said holding means comprise an extension of each said key engaged around the respective lug.

* * * * *